(12) United States Patent
Shirakawa

(10) Patent No.: US 8,697,310 B2
(45) Date of Patent: Apr. 15, 2014

(54) FUEL CELL WITH VOLTAGE DETECTION TERMINAL

(75) Inventor: Tsutomu Shirakawa, Toyota (JP)

(73) Assignee: Toyota Jidosha Kabushiki Kaisha, Toyota-shi, Aichin-ken (JP)

( * ) Notice: Subject to any disclaimer, the term of this patent is extended or adjusted under 35 U.S.C. 154(b) by 747 days.

(21) Appl. No.: 12/664,684

(22) PCT Filed: Jun. 27, 2008

(86) PCT No.: PCT/IB2008/001687
§ 371 (c)(1),
(2), (4) Date: Dec. 15, 2009

(87) PCT Pub. No.: WO2009/001207
PCT Pub. Date: Dec. 31, 2008

(65) Prior Publication Data
US 2010/0178590 A1 Jul. 15, 2010

(30) Foreign Application Priority Data
Jun. 27, 2007 (JP) ................. 2007-168585

(51) Int. Cl.
*H01M 8/00* (2006.01)
*H01M 8/02* (2006.01)
*H01M 8/04* (2006.01)

(52) U.S. Cl.
USPC .......................... 429/507; 429/511

(58) Field of Classification Search
USPC ................. 429/507, 517, 518, 431, 432
See application file for complete search history.

(56) References Cited

U.S. PATENT DOCUMENTS
2004/0028969 A1   2/2004   Aoto

FOREIGN PATENT DOCUMENTS

| EP | 1 580 829 A1 | 9/2005 |
|---|---|---|
| JP | 4-267062 | 9/1992 |
| JP | 2001-256992 | 9/2001 |
| JP | 2002-358993 | 12/2002 |
| JP | 2007-179876 | 7/2007 |
| JP | 2007-242325 | 9/2007 |
| JP | 2007-242334 | 9/2007 |
| WO | WO 2006/062147 A1 | 6/2006 |

OTHER PUBLICATIONS
English Translation of Inui et al. (JP 2007-179876, Published Jul. 12, 2007).*
English Translation of Harumi et al. (JP 2001-256992, Published Sep. 21, 2001).*

* cited by examiner

*Primary Examiner* — Basia Ridley
*Assistant Examiner* — Caitlin Wilmot
(74) *Attorney, Agent, or Firm* — Finnegan, Henderson, Farabow, Garrett & Dunner, LLP

(57) ABSTRACT

A fuel cell includes a separator assembly in which a plurality of plates are laminated on each other and adjacent ones of the plates are secured to each other such that external force does not cause displacement of the plates relative to each other, a terminal used for detecting voltage, and a terminal connecting portion provided in the separator assembly for connecting the terminal to the separator assembly.

17 Claims, 6 Drawing Sheets

FIG. 3
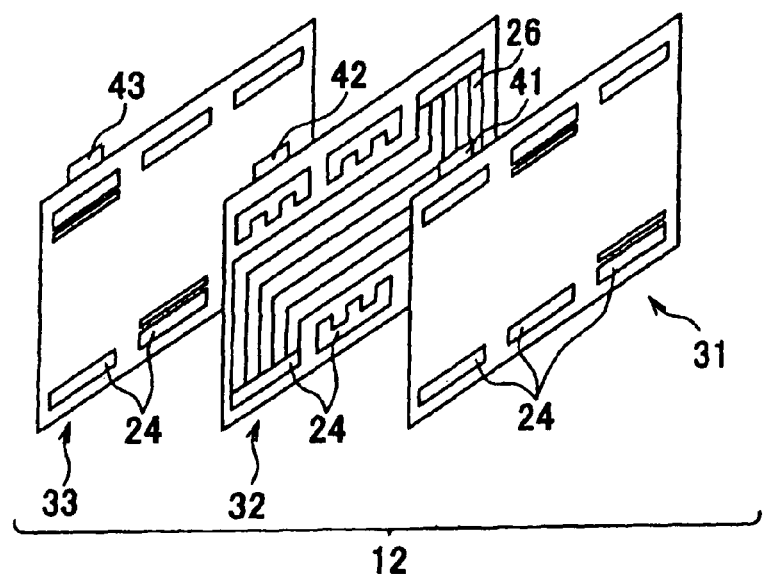
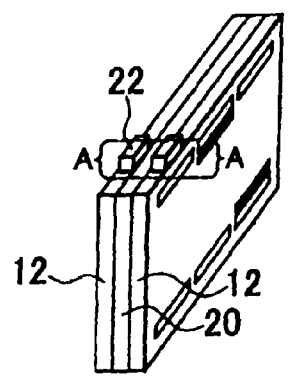
FIG. 4A
FIG. 4B
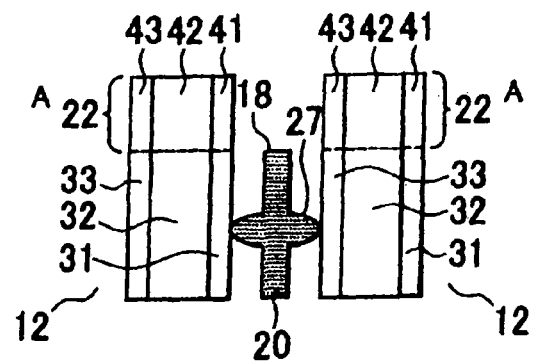

FUEL CELL WITH VOLTAGE DETECTION TERMINAL

CROSS-REFERENCE TO RELATED APPLICATIONS

This application is a national phase application of International Application No. PCT/IB2008/001687, filed Jun. 27, 2008, and claims the priority of Japanese Application No. 2007-168585, filed Jun. 27, 2007, the contents of both of which are incorporated herein by reference.

BACKGROUND OF THE INVENTION

1. Field of the Invention

This invention relates to fuel cells, and more particularly to fuel cells capable of favorably measuring partial voltages within a stack of the fuel cells.

2. Description of the Related Art

A fuel cell is generally known in which a membrane electrode assembly formed by integrating an electrolyte membrane with electrode catalyst layers, or the like, and separators are laminated or stacked together. In this type of fuel cell, a set of separators may be composed of two or more separator components (which will be hereinafter called "plates"). For example, a membrane electrode assembly is sandwiched between two plates, i.e., a cathode-side plate and an anode-side plate, to form a unit cell, and a plurality of unit cells are stacked together to provide a fuel cell stack, as disclosed in Japanese Patent Application Publication No. 2001-256992 (JP-A-2001-256992). In this fuel cell structure, two plates are present between the adjacent membrane electrode assemblies, and these two plates provide a set of separators. In the following description, the set of separators composed of two or more plates may be regarded as "separator assembly". As another example, Japanese Patent Application Publication No. 4-267062 (JP-A-04-267062) discloses a separator assembly composed of three metal plates.

In the fuel cell stack, terminals for detecting voltage may be provided on the separators, so as to monitor the power generation status in each of the membrane electrode assemblies. For example, it is disclosed in JP-A-2001-256992 that a terminal for measuring voltage is attached to the corresponding separator assembly such that two plates of the separator assembly are gripped by the terminal.

In the separator assembly consisting of two or more plates, however, external force or vibrations may cause the plates to be displaced relative to each other. Therefore, if a terminal for measuring voltage is connected to the separator assembly, force may be applied to the terminal due to displacement of the plate(s), and the terminal may deform or fall off. In this case, voltage may not be measured with accuracy.

SUMMARY OF THE INVENTION

This invention provides a fuel cell that prevents external force from being applied to terminals for measuring voltage.

A fuel cell according to one aspect of the invention includes: a separator assembly in which a plurality of plates are laminated on each other and adjacent ones of the plates are secured to each other such that external force does not cause displacement of the plates relative to each other, a terminal connecting portion provided in the separator assembly, and a terminal used for detecting voltage, which is connected to the terminal connecting portion.

In the fuel cell according to the above aspect of the invention, the entire areas of major surfaces of the plates may be secured to each other, to provide the separator assembly.

In the fuel cell according to the above aspect of the invention, the terminal connecting portion may protrude outwards from a side face of the separator assembly.

In the fuel cell according to the above aspect of the invention, each of the plates may include a protrusion that protrudes outwards from a side face of the plate, and the protrusions of the plates may be laminated together to form the terminal connecting portion, while the adjacent ones of the plates may be secured to each other in the terminal connecting portion.

In the fuel cell according to the above aspect of the invention, the separator assembly may consist of three plates that are laminated on each other, and a middle one of the three plates may have a larger thickness than the other plates.

In the fuel cell according to the above aspect of the invention, the terminal may be attached to the terminal connecting portion such that the terminal extends continuously over a top face and opposite side faces of the terminal connecting portion.

In the fuel cell according to the above aspect of the invention, the terminal may be detachably engaged with the terminal connecting portion.

In the fuel cell according to the above aspect of the invention, the terminal connecting portion may include an engaging portion that engages with the terminal so as to prevent slipping of the terminal.

In the fuel cell according to the above aspect of the invention, the engaging portion may be in the form of at least one opening formed in at least one of the plates, and the terminal may include a folded portion adapted to be engaged with the at least one opening.

In the fuel cell according to the above aspect of the invention, the separator assembly may consist of three plates that are laminated on each other, and each of the three plates may have an opening, while the opening of a middle one of the three plates may be larger in size than those of the other plates.

In the fuel cell according to the above aspect of the invention, the engaging portion may be in the form of an opening that extends through the laminated plates, and the terminal may be inserted through the opening for engagement with the terminal connecting portion.

In the fuel cell according to the above aspect of the invention, at least a part of the terminal connecting portion may be subjected to a surface treatment for reducing contact resistance between the terminal and the terminal connecting portion.

In the fuel cell according to the above aspect of the invention, at least a part of the terminal connecting portion may be subjected to a surface treatment for increasing frictional resistance between the terminal and the terminal connecting portion.

In the fuel cell according to the above aspect of the invention, a securing member may be applied by coating to an interface between adjacent ones of the plates so as to secure the plates to each other.

In the fuel cell according to the above aspect of the invention, the plates and the securing member may be made of metal, and the adjacent plates may be secured to each other through metal-to-metal bonding with the securing member.

In the fuel cell according to the above aspect of the invention, the plates may be made of metal, and the adjacent plates may be secured to each other by brazing.

In the fuel cell according to the above aspect of the invention, the plates may be made of metal, and the adjacent plates may be secured to each other by welding.

In the fuel cell according to the above aspect of the invention, the adjacent plates may be fitted on each other to be secured to each other.

With the fuel cell constructed according to the above aspect of the invention, the plates that constitute the separator assembly are less likely to be displaced or prevented from being displaced relative to each other. Accordingly, external force is less likely to be applied or prevented from being applied to the terminal due to displacement of the plates.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 3 is an exploded view of a separator assembly of the first embodiment of the invention;

FIG. 4A is a view showing a laminated assembly including terminal connecting portions according to the first embodiment of the invention;

FIG. 4B is a cross-sectional view taken along line A-A in FIG. 4A, which shows the laminated assembly including the terminal connecting portions according to the first embodiment of the invention;

DETAILED DESCRIPTION OF EMBODIMENTS

Figure 1:
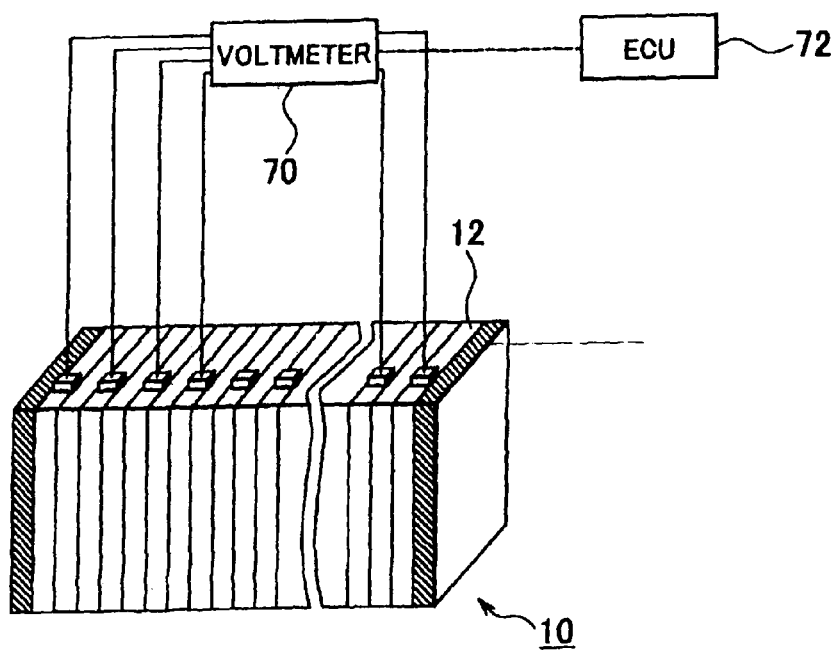
FIG. 1 is a schematic view showing the construction of a system according to a first embodiment of the invention.

FIG. 1 is a schematic view useful for explaining a system according to a first embodiment of the invention. The system shown in FIG. 1 includes a fuel cell stack 10. To provide the fuel cell stack 10, a plurality of separator assemblies 12, seal-integrated MEGAs (Membrane Electrode & Gas Diffusion Layer Assembly), and other components are stacked together. In the system of the first embodiment, terminals of a voltmeter 70 are connected to selected ones of the separator assemblies 12 so as to monitor the power generation status. It is thus possible to check the power generation status between the separator assemblies connected to the terminals of the voltmeter 70, by measuring potential differences between these terminals. The information obtained from the voltmeter 70 is transmitted to an ECU 72 where the information is used for various controls, for example, for changing the supply pressures of reaction gases.

Figure 2:
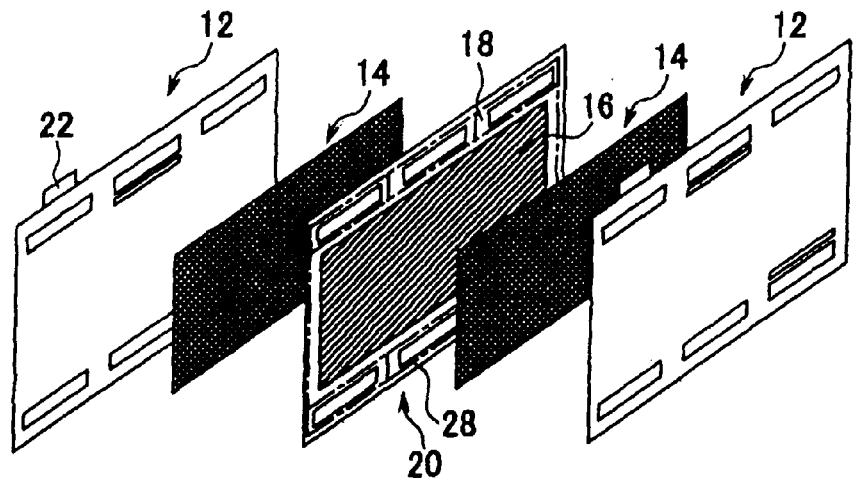
FIG. 2 is a view showing the stacked structure of the first embodiment of the invention.

FIG. 2 is a view useful for explaining the stacked structure of the fuel cell stack 10. As shown in FIG. 2, the fuel cell stack 10 used in the system of the first embodiment includes separator assemblies 12, porous bodies 14 and seal-integrated MEGA 20. The seal-integrated MEGA 20 consists of a MEGA 16 and a seal gasket 18. The MEGA 16 consists of an electrolyte membrane, electrode catalyst layers and gas diffusion layers. In this embodiment, the MEGA 16 and the seal gasket 18 are integrated with each other, to provide the seal-integrated MEGA 20. The porous body 14 functions as in-plane channels for reaction gas, through which the reaction gas supplied to the porous body 14 is distributed to the MEGA 16. The fuel cell stack of this embodiment is formed by stacking a plurality of assemblies each (i.e., one unit) of which consists of the above-described separator assembly 12, porous body 14, seal-integrated MEGA 20, and the porous body 14.

In this embodiment, the MEGA 16 is generally rectangular in shape, and the seal gasket 18 is provided around the MEGA 16, as shown in FIG. 2. The porous body 14 has substantially the same shape as the MEGA 16, and is positioned to be opposed to the MEGA 16. The outside shape of the separator assembly 12 is generally rectangular, and has substantially the same size as the seal-integrated MEGA 20. The separator assembly 12 has a terminal connecting portion 22 that protrudes from a side face of the assembly 12. One terminal of the above-mentioned voltmeter 70 is connected to the terminal connecting portion 22.

FIG. 3 is an exploded view of the separator assembly 12. As shown in FIG. 3, the separator assembly 12 of the first embodiment consists of three plates, i.e., a first plate 31, a second plate 32 and a third plate 33. These plates are formed from sheets made of titanium. The three plates 31, 32, 33 are secured to each other by brazing, to provide the separator assembly 12.

Each of the plates 31, 32, 33 includes openings 24 corresponding to manifolds through which reaction gas and coolant are supplied and discharged, and the second plate 32 further includes long holes 26 that provide coolant channels extending along the plane of the plate 32. The plates 31, 32, 33 have respective protrusions 41, 42, 43 that protrude outwards from side faces of the corresponding plates. The protrusions 41, 42, 43 are laminated on each other to provide the above-mentioned terminal connecting portion 22.

The brazing process includes the steps or applying by coating a brazing filler metal to the entire area of a surface of the first plate 31 that is opposed to the second plate 32 and the entire area of a surface of the third plate 33 that is opposed to the second plate 32, laminating the three plates 31, 32, 33 on each other, and then heating the resulting assembly at a temperature that exceeds the fusing point of the brazing filler metal. In the coating step, the protrusions 41, 43 of the first and third plates 31, 33 are also coated with the brazing filler metal. As a result, adjacent ones of the protrusions are also secured to each other.

FIG. 4A illustrates the stacked structure of the components shown in FIG. 2, and FIG. 4B is a cross-sectional view taken along line A-A in FIG. 4A. In this embodiment, the terminal connecting portions 22 protrude from the side faces of the separator assemblies 12. Thus, the terminal connecting portions 22 are located outside the seal-integrated MEGA 20. The seal gasket portion 18 of the seal-integrated MEGA 20 has projections 27, which provide seal lines 28 for preventing fluid from leaking from the interior of the fuel cell stack. In this embodiment, the second plate 32 located at the middle of the assembly of three plates has a larger thickness than the first plate 31 and the third plate 33, as shown in FIG. 4B.

Figure 5A:
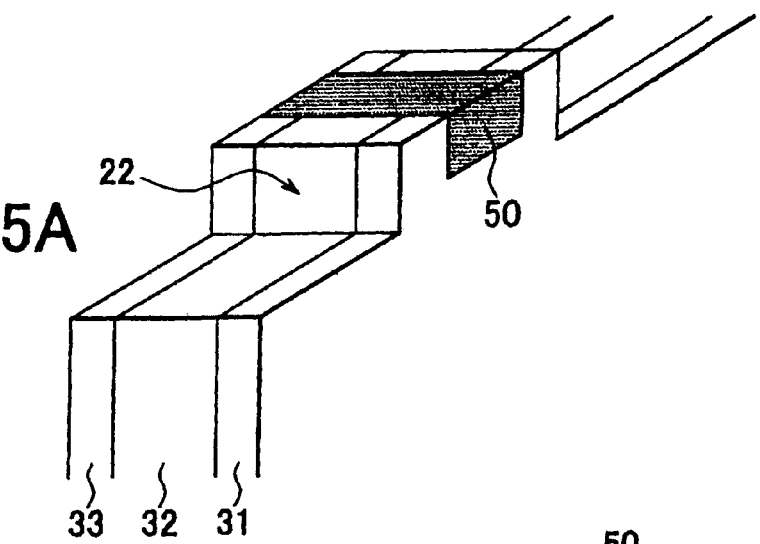
FIG. 5A is an enlarged, perspective view of a terminal connecting portion of the first embodiment of the invention.
Figure 5B:
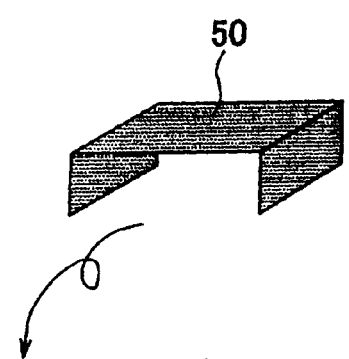
FIG. 5B is an enlarged, perspective view of the terminal connecting portion of the first embodiment of the invention, which view focuses on a terminal 50.
Figure 5B:
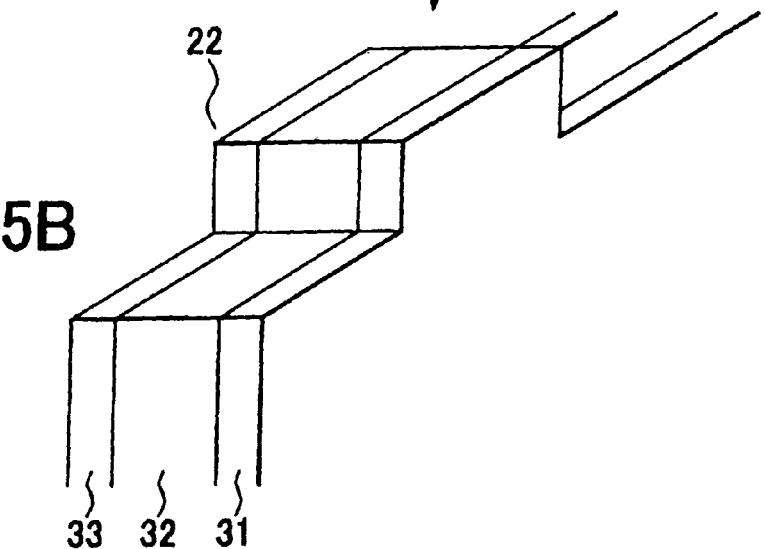

FIG. 5A and FIG. 5B are enlarged, perspective views of the terminal connecting portion 22. As shown in FIG. 5B, the terminal 50 is formed by bending a flat, metal sheet at about right angles generally at two locations. After joining the three plates into the separator assembly 12, the terminal 50 is attached to the terminal connecting portion 22 to extend continuously over the top and side faces of the terminal connecting portion 22. In other words, the terminal connecting portion 22 is sandwiched by and between the orthogonally bent portions of the terminal 50. To facilitate mounting and removal of the terminal 50, the interface between the terminal 50 and the terminal connecting portion 22 is not subjected to brazing or welding. In this embodiment, the terminal 50 is connected to the terminal connecting portion 22 such that all of the three plates 31, 32, 33 are placed in or embraced by the terminal 50, as shown in FIG. 5A. In FIGS. 5A and 5B, a line connecting the terminal 50 with the voltmeter is not illustrated.

In the first embodiment, the plates 31, 32, 33 are secured to each other by brazing. On the other hand, it may be considered to form a separator assembly from two or more plates without securing the plates to each other. However, if the plates are not secured to each other, a displacement or shift may occur between the plates. If such a displacement occurs, force may be applied to the terminal, and the terminal may bend or fall off. In this respect, the plates 31, 32, 33 of this embodiment are secured together, and no displacement occurs between the plates. Therefore, the terminal 50 is prevented from being deformed or falling off.

Also, in this embodiment, the terminal connecting portion 22 protrudes from a side face of the corresponding separator assembly 12. Therefore, the terminal 50 is easily connected to the terminal connecting portion 22. Also, the terminal connecting portion 22 may be located outside the seal line 28 that is provided by the rectangular seal gasket 18 corresponding to the rectangular MEGA 16. In this connection, it is to be noted that the MEGA 16 is preferably rectangular in shape, in terms of productivity or production efficiency.

The second plate 32 having a larger thickness than the first and third plates 31, 33 is highly resistant to bending stress, and is unlikely to be deformed. Therefore, even when force large enough to bend a separator is applied to the separator assembly 22, the second plate 32 resists this force, and prevents the other plates 31, 33 from bending. Thus, the separator assembly 12 as a whole provides a structure that is highly resistant to bending stress. Accordingly, external force is less likely to be applied or is prevented from being applied to the terminal 50 due to deformation of the separator assembly 12 as a whole or the terminal connecting portion 22. In this embodiment in which the second plate 32 also forms the in-plane coolant channels, a pressure loss of the coolant may be reduced by forming the second plate 32 with a sufficiently large thickness Also, all of the three plates 31, 32, 33 are provided with the protrusions 41, 42, 43, and the terminal connecting portion 22 is constituted by the three plates 31, 32, 33 laminated together. Thus, the laminated three plates are placed in the protruding terminal connecting portion 22, and the terminal 50 is arranged to extend over all of the three plates or embrace all of the three plates. With this arrangement, the terminal connecting portion 22 is given a sufficiently large thickness, and the terminal 50 is easily connected to the terminal connecting portion 22.

Since the plates are secured to each other by brazing in the terminal connecting portion 22, any one of the protrusions 41, 42, 43 of the plates 31, 32, 33 may not be deformed alone. Even if certain force is applied to the protruding terminal connecting portion, this portion may resist the force with the combined rigidity of the three plates, which makes the terminal connecting portion 22 highly resistant to stress. Thus, external force is further prevented from being applied to the terminal 50 due to deformation of the terminal connecting portion 22.

Also, the plates are secured to each other by brazing in this embodiment. Therefore, the plates are unlikely to be deformed when joined to each other. Accordingly, the shape and dimensions of the terminal connecting portion are less likely or unlikely to deviate from those as designed, and unexpected falling-off of the terminal may be reduced or prevented. In the case of brazing, the plates are secured to each other through metal-to-metal bonding, thus assuring conductivity in the direction in which the plates are laminated, and voltage may be detected with high accuracy.

In the first embodiment, the three plates in the form of metal plates are secured to each other to provide the separator assembly. However, the number of the plates is not limited to three, but may be, for example, two, provided that the separator assembly is composed of two or more plates. If the two or more plates are secured to each other, no displacement occurs between the plates, which is advantageous in that substantially no force is applied to the terminal.

While the plates are made of titanium in the first embodiment, the plates may be made of any other material provided that the plates may act as separators. More specifically, the plates may be formed of a material having electrical conductivity and gas impermeability. For example, the plates may be made of another metal, such as stainless steel, or may be made of carbon. When the plates made of a material other than metal are used, these plates may not be secured to each other by brazing; therefore, the plates are secured to each other by another method. Examples of methods other than brazing will be described later.

In the first embodiment, the thickness of the second plate 32 is made larger than those of the first plate 31 and third plate 33. While it is preferable to form the second plate 32 with a relatively large thickness as described above, the thickness of the other plates may be increased. It is also possible to form the three plates with the same thickness.

In the first embodiment, the plates are secured to each other by brazing. While it is preferable to secure the plates to each other by brazing, the plates may be secured to each other by other methods. For example, the plates may be secured to each other by welding, or bonding with an adhesive, or the plates may be fitted on or engaged with each other to provide a fit structure. Where the plates are secured to each other by bonding with an adhesive or fitting, a metal-to-metal bond is not formed between the adjacent plates, and it is thus preferable to perform a treatment so as to ensure electrical conductivity between the plates. In the case where the plates are made of a material other than metal, the plates may not be secured to each other by welding or brazing, but may be secured to each other by bonding with an adhesive or fitting.

In the first embodiment, the brazing filler metal is applied to the entire areas of the major surfaces of the plates 31, 33 including the protrusions 41, 43 in the brazing step. As described above, it is preferable to coat the entire major surfaces of the plates with the brazing filler metal. However, if the plates are secured to each other at any location or locations, namely, if the plates are at least partially secured to each other, displacements between the plates may be reduced or prevented. For example, only the protrusions may be subjected to brazing, or the surfaces of the plates excluding the protrusions may be subjected to brazing. These modifications may be similarly applied to other embodiments which will be described below.

Figure 6:
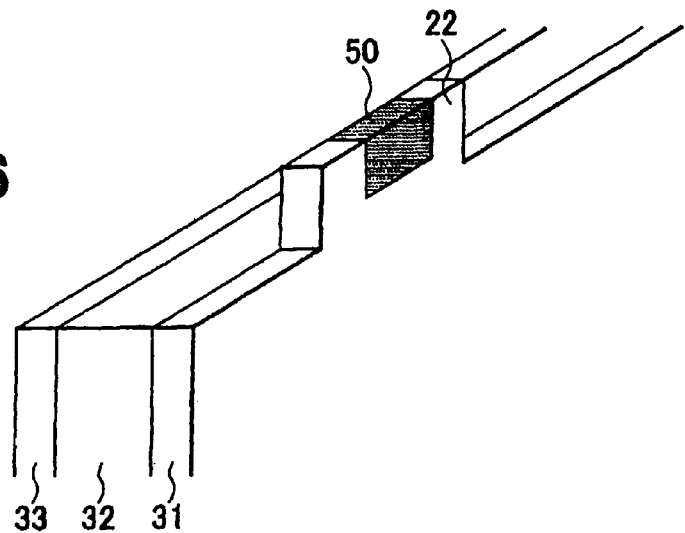
FIG. 6 is an enlarged, perspective view of a terminal connecting portion according to a modified example of the first embodiment of the invention.

FIG. 6 is an enlarged, perspective view of a terminal connecting portion 22 according to another modified example of the first embodiment. In the first embodiment, all of the plates have protrusions, and the terminal connecting portion is constructed of the protrusions of the three plates that are laminated on each other. While it is preferable that all of the plates have the protrusions, as described above, the invention is not limited to this arrangement. In the modified example as shown in FIG. 6, only the first plate 31 has a protrusion. In this case, the terminal 50 is connected to the terminal connecting portion 22 to extend over the top and side faces of the protrusion of the first plate 31.

In the above arrangement in which the terminal is attached to the protrusion of only one plate, force may be applied to the terminal 50 if the second plate 32 undergoes displacement and hits against the terminal 50, for example. In this modified example, the plates 31, 32, 33 are secured to each other, and therefore, the terminal is prevented from being deformed or falling off due to displacement of the plates.

Figure 7A:
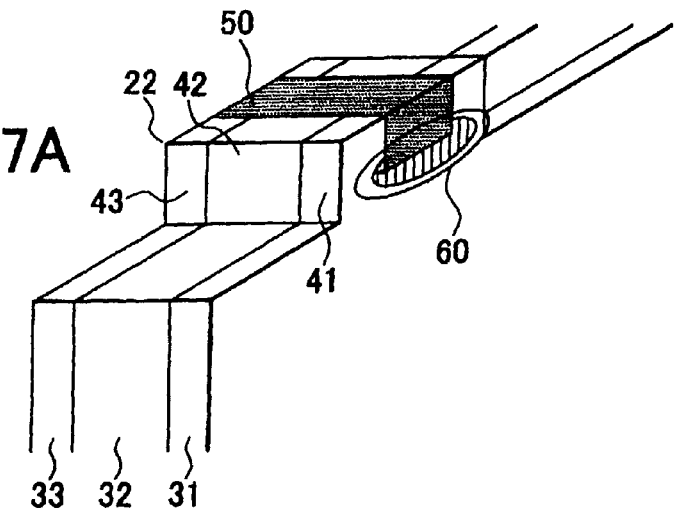
FIG. 7A is an enlarged, perspective view of a terminal connecting portion according to a second embodiment of the invention.
Figure 7B:
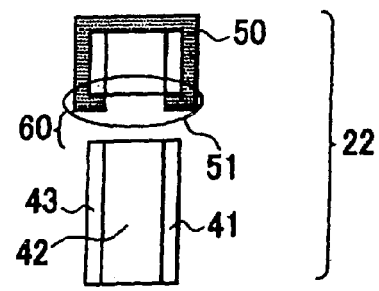
FIG. 7B is a cross-sectional view of the terminal connecting portion of the second embodiment of the invention.

FIG. 7A is an enlarged, perspective view of a terminal connecting portion according to a second embodiment of the invention, and FIG. 7B is a cross-sectional view thereof. In the separator assembly 12 of this embodiment, the terminal connecting portion 22 has an engaging portion 60 that engages with the terminal 50 so as to restrict or prevent slipping or detachment of the terminal. As shown in FIG. 7B, the engaging portion 60 takes the form of a through-hole that extends through the terminal connecting portion 22. More specifically, openings having substantially the same shape are formed in the protrusions 41, 42, 43 of the plates 31, 32, 33 that constitute the separator assembly 12. Also, the terminal 50 includes a folded portion 51 that is arranged to engage with the through-hole. The other features of the second embodiment are similar to those of the first embodiment.

The engaging portion 60 of the terminal connecting portion 22 and the folded portion 51 of the terminal 50 engage with each other so that the terminal 50 is further prevented from falling off. If one or more plates undergo displacement while the terminal connecting portion 22 and the terminal 50 are engaged with each other, stress is likely to be applied to the terminal 50 at a location where the terminal 50 is engaged with the terminal connecting portion 22. In this embodiment, however, the plates, which are secured to each other, are not displaced relative to each other. Thus, owing to a synergistic effect of securing of the plates and engagement at the engaging portion 60, falling-off (or detachment) and deformation of the terminal 50 are effectively restricted or prevented.

While the engaging portion 60 may be formed by forming recesses in the surfaces of the plates, the plates need to have a thickness large enough to allow formation of the recesses in the surfaces of the plates. On the other hand, it is desired to make the separator assembly as thin as possible so as to achieve reduction in the size of the fuel cell stack. In view of the balance between the reduction in the size of the separator assembly and functioning as the separator, it is preferable to use metal sheets having a thickness of about 0.1 to 0.5 millimeters for forming the plates. If the metal sheets of this thickness range are used as the plates, it is difficult to form recesses in the surfaces of the plates, because of the small thickness and hardness thereof. In this respect, the engaging portion 60 of this embodiment is formed by forming the openings in the protrusions 41, 42, 48 of the plates. Thus, the engaging portion may be readily formed even when the plates are formed from thin metal sheets as described above.

FIG. 8A through FIG. 8E are cross-sectional views of terminal connecting portions according to modified examples of the second embodiment. While the engaging portion 60 of the second embodiment is in the form of a through-hole that extends through all of the three plates, and the terminal is arranged to partially surround the plates, the invention is not limited to these features of the second embodiment, but various modified examples as shown in FIG. 8A through FIG. 8E may be considered.

Figures 8A, 8B:
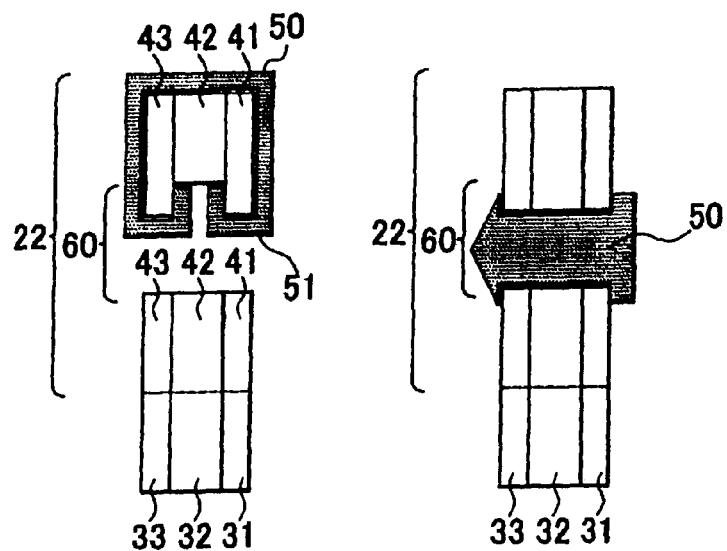
FIG. 8A is a cross-sectional view of a terminal connecting portion according to a modified example of the second embodiment of the invention.
FIG. 8B is a cross-sectional view of a terminal connecting portion according to another modified example of the second embodiment of the invention.

For example, the openings formed in the respective plates may be different in size. For example, only the opening formed in the second plate 32 may be made larger in size than the openings of the other plates 31, 33, as shown in FIG. 8A. With this arrangement, the folded portion 51 of the terminal 50 may be folded up once again, and slipping or falling-off of the terminal 50 may be prevented with improved reliability.

Figures 8C, 8D, 8E:
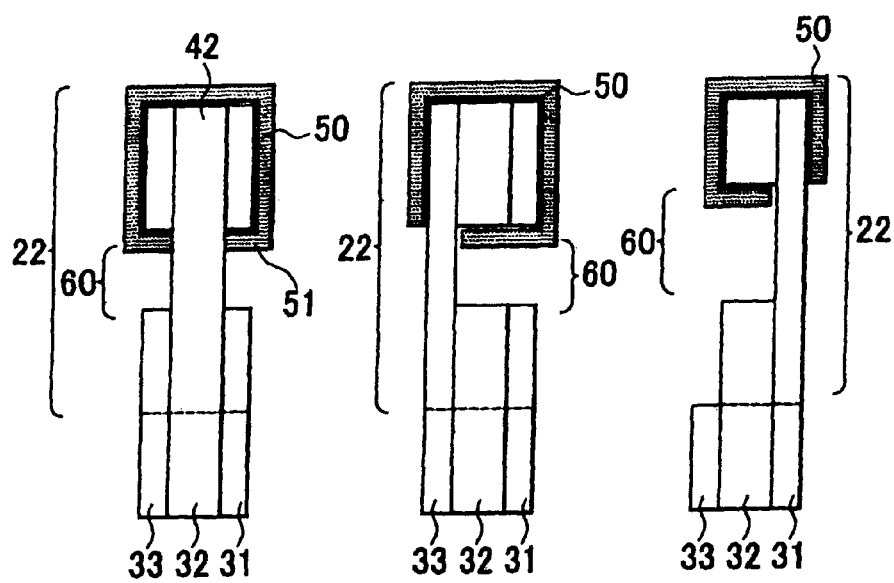
FIG. 8C is a cross-sectional view of a terminal connecting portion according to another modified example of the second embodiment of the invention.
FIG. 8D is a cross-sectional view of a terminal connecting portion according to another modified example of the second embodiment of the invention.
FIG. 8E is a cross-sectional view of a terminal connecting portion according to another modified example of the second embodiment of the invention.

Also, as shown in FIG. 8C, the openings may be formed in the first plate 31 and the third plate 33. In this case, the protrusion 42 of the second plate 32 has no opening, and therefore the strength of the protrusion 42 of the second plate 32 may not be impaired. Since the protrusions of the other plates are secured to the protrusion of the second plate, the terminal connecting portion 22 as a whole exhibits high strength, and is highly resistant to bending stress. Namely, the engaging portion 60 may be formed while assuring sufficient strength of the terminal connecting portion 22 and thereby preventing deformation of the terminal connecting portion 22.

Also, as shown in FIG. 8D, the openings may be formed in the first plate 31 and the second plate 32.

The engaging portion may also be formed even in the case where one or more of the plates, rather than all of the plates, have no protrusion. For example, when the third plate 33 has no protrusion, as shown in FIG. 8E, the protrusion 42 of the second plate 32, out of the protrusions 41, 42 of the first plate 31 and second plate 32, may be provided with an opening. While the opening is formed in the second plate in the example of FIG. 8E, an opening may be formed in the first plate, or openings may be formed in the first and second plates.

Even in the case where only one of the plates has a protrusion, an opening may be formed in the protrusion to provide an engaging portion similar to those as described above. These modifications may also be similarly applied when the separator assembly consists of two plates, rather than three plates. In any case, the engaging portion may be formed by providing at least one of the plates that constitute the terminal connecting portion with an opening or openings.

If it is possible to form recesses in the surfaces of the plates, the engaging portion may be formed by providing the plates with the recesses, rather than the openings. Also, the terminal may take any form provided that it may engage with the engaging portion. For example, the terminal may be configured to be inserted through a through-hole, as shown in FIG. 8B.

Figure 9:
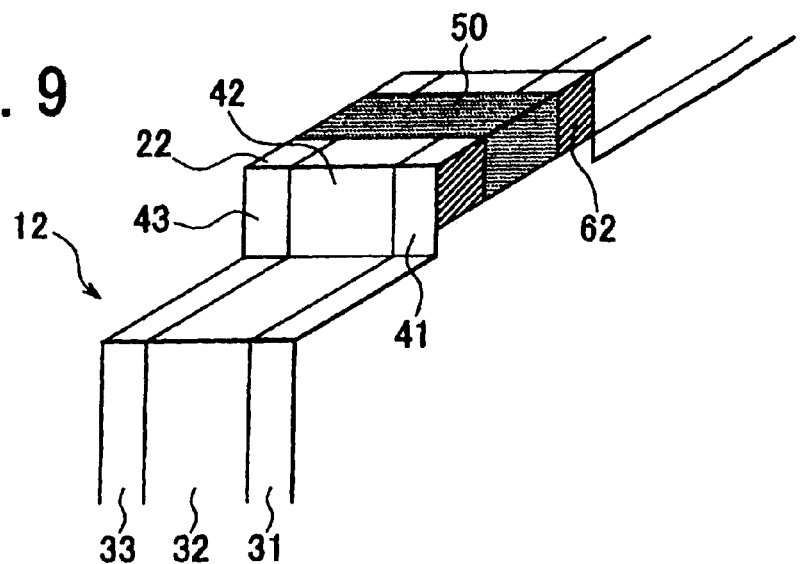
FIG. 9 is an enlarged, perspective view of a terminal connecting portion according to a third embodiment of the invention.

FIG. 9 is a schematic view showing a terminal connecting portion according to a third embodiment of the invention. In this embodiment, a side face of the terminal connecting portion 22, which is a part of a major surface of the first plate 31, is subjected to a surface treatment for reducing contact resistance this to contact with the terminal 50, to thus provide a surface treatment region 62. More specifically, the surface treatment region 62 is a region that is plated with gold. The other features of this embodiment are substantially the same as those of the first embodiment.

When the plates are made of metal, oxide films are formed on the surfaces of the plates, resulting in an increase in the contact resistance between the terminal 50 and the terminal connecting portion 22. If at least a part of the terminal connecting portion 22 is plated with gold, the contact resistance is reduced, thus assuring accurate measurements of voltage.

In the third embodiment, only the terminal connecting portion 22 of the separator assembly 12 is subjected to the surface treatment. However, portions or surfaces of the separator assembly 12 which are in contact with the porous bodies 14 (or which are opposed to the MEGA 16) may be subjected to the surface treatment. In this case, it is preferable to carry out these surface treatments in the same process step in terms of productivity or production efficiency.

Also, the terminal connecting portion 22 may be subjected to a treatment or process for increasing the friction resistance so as to prevent slipping of the terminal, as well as the above-mentioned treatment for reducing the contact resistance. For example, one or more surfaces of the terminal connecting portion 22 may be roughened.

While the side face of the terminal connecting portion 22, which is a part of the major surface of the first plate 31, is subjected to the surface treatment in the third embodiment, the surface treatment may be performed on the opposite side face of the terminal connecting portion 22 which is a part of a major surface of the third plate 33, or on the top face of the terminal connecting portion 22. Also, any combination of the top and side faces of the terminal connecting portion 22 may be subjected to the surface treatment. In sum, the surface treatment may be performed on a region including at least a part of the surfaces of the terminal connecting portion 22 that are in contact with the terminal 50.

Figure 10:
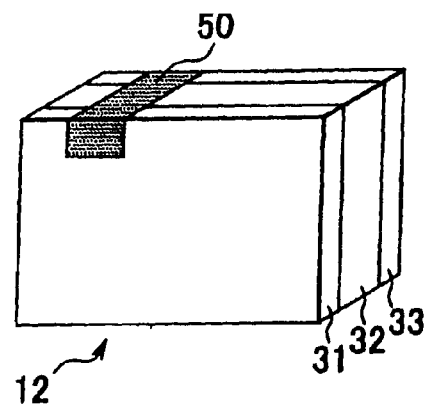
FIG. 10 is a view showing a separator assembly of a fourth embodiment of the invention.

FIG. 10 is a view showing a separator assembly 12 according to a fourth embodiment of the invention. In this embodiment, the terminal connecting portion does not protrude from the separator assembly 12. In other words, the respective plates that constitute the separator assembly have no protrusions. In this embodiment, too, the plates are secured to each other, and therefore the terminal 50 is prevented from slipping or falling off due to displacement of the plates. In this embodiment, a portion of the separator assembly 12 to which the terminal 50 is connected provides the terminal connecting portion.

While the terminal 50 is connected to the separator assembly 12 so as to extend over all of the three plates in the fourth embodiment, the present invention is not limited to this arrangement. Namely, even in the case where the terminal connecting portion does not protrude from the separator assembly 12, the terminal 50 may be arranged to extend over all of the plates, or extend over only part of the plates. Even where the terminal 50 extends over only part of the plates, slipping or falling-off of the terminal 50 may be prevented since the plates are secured to each other, as described above with respect to the modified examples of the first embodiment.

Figure 11:
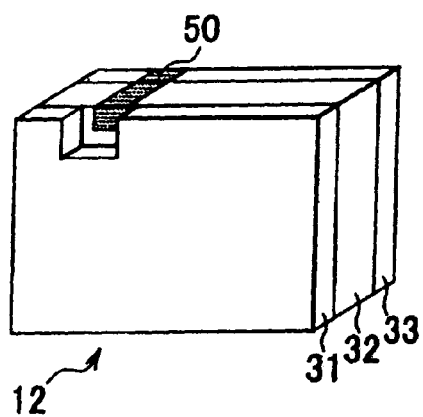
FIG. 11 is a view showing a separator assembly of a modified example of the fourth embodiment of the invention.

FIG. 11 is a schematic view showing a separator assembly 12 according to a modified example of the fourth embodiment. In this modified example, a recess is formed in the first plate 31, so that the terminal 50 extends over the two plates, out of the three plates of the separator assembly 12.

It is to be understood that the modified examples of the other embodiments as described above may also be applied to the fourth embodiment. For example, the terminal connecting portion may be subjected to a suitable surface treatment, or an engaging portion may be formed in the terminal connecting portion.

In the fuel cell according to the present invention, the terminal may be easily attached to the corresponding terminal connecting portion of the separator assembly.

In the fuel cell according to the invention, the plates are secured to each other in the terminal connecting portion. Therefore, any one of the protrusions that constitute the terminal connecting portion is not deformed alone, and the three plates of the terminal connecting portion cooperate to resist stress applied thereto. Thus, the terminal connecting portion has increased strength, and is less likely to be deformed or prevented from being deformed. Consequently, force is prevented from being applied to the terminal.

Also, in the fuel cell according to the invention, the middle plate having a relatively large thickness may resist stress; therefore, the separator assembly has increased strength, and is less likely to be deformed or prevented from being deformed. Consequently, external force is prevented from being applied to the terminal due to deformation of the separator assembly.

In the fuel cell according to the invention, the engaging portion and the terminal are engaged with each other, so that the terminal is further prevented from slipping or falling off.

In the fuel cell according to the invention, the contact resistance between the terminal and the terminal connecting portion is reduced, and therefore, voltage may be measured with improved accuracy.

In the fuel cell according to the invention, the plates are not deformed when they are secured to each other. Accordingly, the shapes and dimensions of the separator assembly and terminal connecting portion do not deviate from those as designed, and the terminal is prevented from unexpectedly falling off from the corresponding terminal connecting portion.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A fuel cell, comprising:
   two separator assemblies, at least one of the two separator assemblies including a plurality of plates laminated on each other, wherein adjacent plates are secured to each other;
   a terminal connecting portion provided in the at least one separator assembly;

a terminal used for detecting voltage, said terminal being connected to the terminal connecting portion; and a seal gasket;

wherein:

the terminal connecting portion includes an engaging portion that engages with the terminal so as to prevent slipping of the terminal;

the engaging portion includes at least one through-hole that extends through at least one of the laminated plates;

the terminal is inserted through the at least one through-hole for engagement with the terminal connecting portion;

the seal gasket is sandwiched between the two separator assemblies; and the at least one through-hole is formed in the at least one separator assembly.

2. The fuel cell according to claim 1, wherein the entire areas of major surfaces of the plates are secured to each other, to provide the at least one separator assembly.

3. The fuel cell according to claim 1, wherein the terminal connecting portion protrudes outwards from a side face of the at least one separator assembly.

4. The fuel cell according to claim 1, wherein:

each of the plates includes a protrusion that protrudes outwards from a side face of said each plate; and the protrusions of the plates are laminated together to form the terminal connecting portion, and the adjacent plates are secured to each other in the terminal connecting portion.

5. The fuel cell according to claim 1, wherein:

the at least one separator assembly includes three plates as said plates which are laminated on each other; and a middle one of the three plates has a larger thickness than the other plates.

6. The fuel cell according to claim 1, wherein the terminal is attached to the terminal connecting portion such that the terminal extends continuously over a top face and opposite side faces of the terminal connecting portion.

7. The fuel cell according to claim 1, wherein the terminal is detachably engaged with the terminal connecting portion.

8. The fuel cell according to claim 1, wherein:

the terminal includes a folded portion adapted to be engaged with the at least one through-hole.

9. The fuel cell according to claim 8, wherein:

the at least one separator assembly includes three plates as said plates which are laminated on each other;

each of the three plates has a respective through-hole as said at least one through-hole; and the through-hole of a middle one of the three plates is larger in size than those of the other plates.

10. The fuel cell according to claim 1, wherein at least a part of the terminal connecting portion is subjected to a surface treatment reducing contact resistance between the terminal and the terminal connecting portion.

11. The fuel cell according to claim 1, wherein at least a part of the terminal connecting portion is subjected to a surface treatment increasing frictional resistance between the terminal and the terminal connecting portion.

12. The fuel cell according to claim 1, wherein a securing member is applied by coating to an interface between adjacent plates so as to secure the plates to each other.

13. The fuel cell according to claim 12, wherein:

the plates and the securing member are made of metal; and the adjacent plates are secured to each other through metal-to-metal bonding with the securing member.

14. The fuel cell according to claim 1, wherein:

the plates are made of metal, and the adjacent plates are secured to each other by brazing.

15. The fuel cell according to claim 1, wherein:

the plates are made of metal; and the adjacent plates are secured to each other by welding.

16. The fuel cell according to claim 1, wherein the adjacent plates are fitted on each other so as to be secured to each other.

17. The fuel cell according to claim 1, wherein the plates are made of metal.

* * * * *